Oct. 4, 1955
A. E. NICKLESS
2,719,722
QUICK CHANGE TOOL HOLDER
Original Filed Dec. 10, 1948
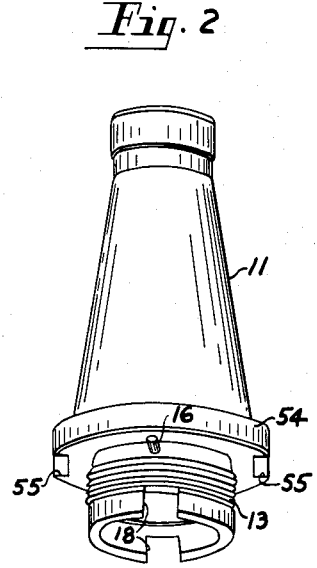
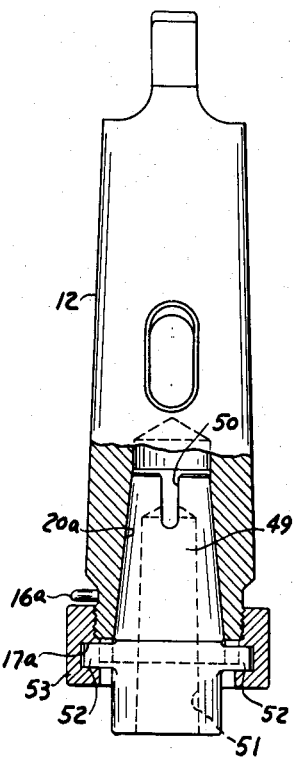
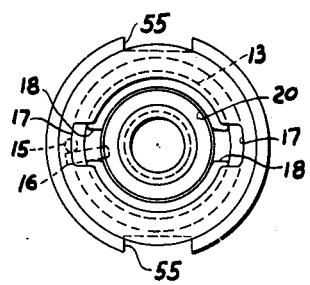
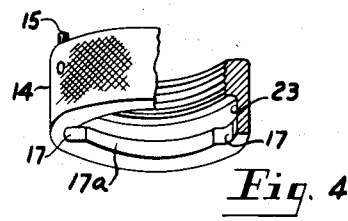
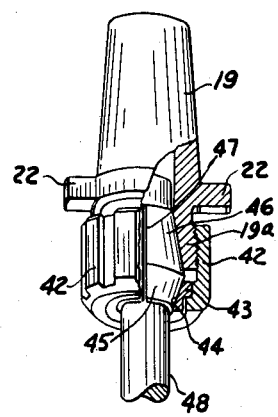
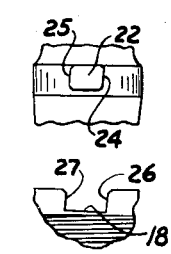
INVENTOR.
ALLEN E. NICKLESS.
BY
ATTORNEY.

United States Patent Office

2,719,722
QUICK CHANGE TOOL HOLDER

Allen E. Nickless, Frankenmuth, Mich., assignor to Universal Engineering Company, Frankenmuth, Mich., a corporation of Michigan Continuation of abandoned application Serial No. 64,661, December 10, 1948. This application October 11, 1952, Serial No. 314,319

8 Claims. (Cl. 279—91)

This application constitutes a continuation of my application Serial No. 64,661, filed December 10, 1948, on a Quick Change Tool Holder, and now abandoned.

My invention relates to a new and useful improvement in a quick change tool holder whereby a quick change may be made from one type or size of a cutting tool to another size or type of cutting tool, and is especially useful on progressive machining operations.

It is an object of the present invention to provide a structure whereby a quick change of tools may be effected without the loss of accuracy, so that when the tool has been removed and replaced the replacing tool will be centered exactly as was the tool which preceded it.

Another object of the invention is the provision in a quick change tool holder of a structure which may be economically manufactured, which is light, compact, durable, highly efficient in use and easily and quickly operated.

Other objects will appear hereinafter.

It is recognized that various modifications and changes may be made in the detail of structure illustrated without departing from the invention, and it is intended that such shall be embraced within the scope of the claims which form a part hereof.

Forming a part of the specification are drawings in which

Fig. 1 is a side elevational view of the supporting member or adapter with a part broken away and a part shown in section, Fig. 2 is a side elevational view of the supporting member or adapter with the securing ring removed, Fig. 3 is a front elevational view of the supporting member or adapter, Fig. 4 is a perspective view of the securing or locking ring with a part broken away and a part shown in section, Fig. 5 is a perspective view of the tool holding adapter with a part broken away and a part shown in section, Fig. 6 is a fragmentary elevational view of a part of the supporting member or adapter and the tool holder, Fig. 7 is a side elevational view of the tool holder and adapter with parts broken away and parts shown in section, illustrating a slight modification.

The invention is adapted for use on milling machines, boring mills, turret lathes, and similar metalworking machines. It is particularly adapted where progressive machining operations on a single piece of material are to be effected, in which operations the work piece is left in the lathe or other metalworking machine and various parts of the work piece are operated upon by different types of tools.

In the drawings I have indicated an adapter or supporting member 11, which has an external taper to fit the tapered socket of the machine with which used and which is provided with a flange 54 having the notches 55 formed therein. This supporting member or adapter 11 is provided with a threaded portion 13 on which is adapted to thread the locking ring or nut 14. Projecting outwardly, axially from the inner face of the ring 14, is a pin 15 adapted to engage the radially projecting pin 16, which is carried by the member 11. At the outer end of the locking ring 14 there is an inwardly directed flange 17a, which is cut away as at 17 to provide a pair of diametrically opposite notches 17. Positioned inwardly of this flange 17a is a groove 23. Formed in the end of the supporting member or adapter 11, outwardly from the threaded portion 13, is a pair of diametrically aligned notches 18.

Another adapter is provided which may be termed a tool holder and comprises a tapered shank 19 having a bore formed therethrough and adapted to engage in the tapered bore 20 of the supporting adapter 11. Projecting radially outwardly from the member 19 at the large end thereof and in diametrical alignment are the lugs 22. Formed on the member 19 is the externally threaded forward portion 19a, on which is adapted to thread the thrust sleeve 42 engaging the thrust ring 43, having a tapered inner surface 44 engaging the tapered end 45 of the collet, which is split as at 47 and which is provided with the rear or inner tapered portion 46 engaging the tapered bore 20 formed in the portion 19a. Positioned within this collet is the tool 48. The construction is such that when the tool is placed within the collet and the parts are located as shown in Fig. 5 and the sleeve 42 threaded into position, the parts will be moved inwardly of the tapered portion 19 so that the collet will securely grip the tool 48. The part 19 is precision ground, as is likewise the bore 20, so that when the part 19 engages in the bore 20, a very close fit will be effected.

In assembling the structure, the ring 14 would be threaded onto the threaded portion 13 to the desired position, and the pin 16 would then be driven into the position shown in Fig. 2. The construction would be such that when the locking ring or nut 14 is turned counterclockwise until the pins 15 and 16 engage, the notches 17 and 18 will be in alignment with each other. When in this position, the tool holder or adapter 19 may then be thrust into the bore 20, the lugs 22 passing through the notches 17 and 18 so as to be aligned with the groove 23. When in this position, a clockwise threading of the nut or locking ring 14 will serve to draw the member 19 inwardly into the supporting member or adapter so as to secure it in the bore 20 in a fit which will prevent rotation. These lugs 22 are ground slightly less in width than the width of the groove 23, so that the lugs 22 will freely ride in the groove 23. When it is desired to remove the member 19, a threading of the lock nut or ring 14 counterclockwise will, through the engagement of the side wall of the groove 23 with the lugs 22, force the member 19 outwardly so that when the notches 17 and 18 again come into alignment the member 19 may be drawn outwardly from the supporting member or adapter 11. When the member 19 is secured in operative position in the hole in the supporting member or adapter 11, the lugs 22 will of course be projecting through the notches or slots 18. The side faces 24 and 25 of these lugs 22 are tapered, as are likewise the sides 26 and 27 of the slots or notches 18. This taper is such that, when the driving action is effected which is in a clockwise direction, the lugs 22 will have a tendency to ride inwardly of the tapered faces 26 and 27 so that the member 19 is thus forced farther inwardly of the bore 20 and a very tight fit effected. This is particularly effective in preventing the tool holder or adapter from working loose under cutting vibration.

In Fig. 7 I have shown a slight modification in which the member 12 corresponds to the member 11 and is provided with a pin 16a and the tapered bore 20a. This member 12 is also provided with a threaded portion on which the lock ring or nut 53 corresponding to the member 14 is threaded. The tool holder or adapter 49 is split at its inner end as in 50 and provided with a tapered bore 51 into which the tool is inserted. The lugs 52 correspond to the lugs 22 and are similarly made.

It is believed obvious that these adapters may be designed and ground to accommodate various tools including shell end mills and many other types of tool. It is also believed obvious that the forward end may be extended and broached to make it a boring bar.

Experience has shown that a tool holder of this class is one which is possessed of the advantages enumerated, and maintains the working tool always in proper position regardless of how many times the tool may be changed and replaced.

What I claim is:

1. A quick change tool holder of the class described, comprising a supporting member having a bore formed therein, and provided at one end with a pair of diametrically aligned axially directed slots; an externally threaded portion inwardly from said slots; an abutment member projecting outwardly from the periphery of said member inwardly of said threaded portion; a locking ring threaded on said threaded portion and having at its outer end a pair of diametrically aligned slots adapted for aligning with the slots in said holding member; an abutment member carried by said ring and adapted for engaging said first-mentioned abutment member upon the aligning of said slots; a radially, inwardly projecting flange on said locking ring interrupted by the slots formed therein and forming one wall of an annular groove on said locking ring; a tool retainer comprising a shank adapted for engaging in said bore and having a bore formed therethrough; a tool engaging in said bore and projecting outwardly from one end of said retainer; means for securing said tool in said bore in fixed relation thereto; a pair of diametrically opposed radially projecting lugs projecting outwardly from the periphery of said retainer adjacent one end thereof and adapted for passing into said slots upon insertion of said retainer into said bore and engaging in said groove and adapted upon rotation of said locking ring for engaging behind said flange.

2. A quick change tool holder of the class described, comprising: a supporting member having a bore formed therein and provided at one end with a pair of diametrically opposite, axially directed slots directed inwardly from said end and terminating adjacent an externally threaded portion of said member; a radially directed pin projecting outwardly from the periphery of said member inwardly of the threaded portion; a collar threadable on said threaded portion and projecting at one end beyond the end of said member, said collar having an internal groove formed therein adjacent the projecting end to provide at said projecting end a radially, inwardly directed flange, said flange having slots formed therein at a pair of diametrically opposite points and adapted for alignment with the slots in said member; and a pin carried by said collar engageable with the pin in said member for limiting rotation of said collar on said member in one direction upon the alignment of the slots in said flange with the slots in said member.

3. A quick change tool holder of the class described, comprising: a supporting member having a bore formed therein and provided at one end with a pair of diametrically opposite, axially directed slots directed inwardly from said end and terminating adjacent an externally threaded portion of said member; a radially directed pin projecting outwardly from the periphery of said member inwardly of the threaded portion; a collar threadable on said threaded portion and projecting at one end beyond the end of said member, said collar having an internal groove formed therein adjacent the projecting end to provide at said projecting end a radially inwardly directed flange, said flange having slots formed therein at a pair of diametrically opposite points and adapted for alignment with the slots in said member; and a pin carried by said collar engageable with the pin in said member for limiting rotation of said collar on said member in one direction upon the alignment of the slots in said flange with the slots in said member; a tool retainer having a body insertable at one end into said bore; a pair of diametrically opposite lugs projecting outwardly from the periphery of said body and projectable through the slots in said flange and into the slots of said body and engageable in said groove, and engageable behind said flange upon rotation of said collar relatively to said body for effecting a disalignment of the slots in said flange with the slots in said body.

4. A quick change tool holder of the class described, comprising: a supporting member having a bore formed therein and provided at one end with a pair of diametrically opposite, axially directed slots directed inwardly from said end and terminating adjacent an externally threaded portion of said member; a radially directed pin projecting outwardly from the periphery of said member inwardly of the threaded portion; a collar threadable on said threaded portion and projecting at one end beyond the end of said member, said collar having an internal groove formed therein, adjacent the projecting end to provide at said projecting end a radially inwardly directed flange, said flange having slots formed therein at a pair of diametrically opposite points and adapted for alignment with the slots in said member; and a pin carried by said collar engageable with the pin in said member for limiting rotation of said collar on said member in one direction upon the alignment of the slots in said flange with the slots in said member; a tool retainer having a body insertable at one end into said bore; a pair of diametrically opposite lugs projecting outwardly from the periphery of said body and projectable through the slots in said flange and into the slots of said body and engageable in said groove, and engageable behind said flange upon rotation of said collar relatively to said body for effecting a disalignment of the slots in said flange with the slots in said body, the side faces of the slots of said body being inclined to the axis of said body and the opposing faces of said lugs opposing the side faces of said slots of said body, being inclined for effecting an inward thrust from said retainer upon rotation of said body.

5. In a quick change tool holder of the class described, a supporting body having a bore formed therethrough adapted for attachment for rotation with a machine with which used; an externally threaded portion on said body adjacent one end and positioned inwardly therefrom, said end having a pair of axially directed slots projecting inwardly from said end toward said threaded portion; a nut-forming sleeve threaded on said threaded portion and projecting beyond the end of said body, said sleeve having an internal groove formed adjacent its projecting end on the inner surface thereof to provide adjacent the outer end of said body a radially, inwardly projecting flange, there being formed in said flange a pair of slots adapted for registration with the slots in said body upon rotation of said sleeve to a predetermined position; an abutment member on said body; an abutment member on said sleeve adapted for engaging the abutment member on said body upon rotation of said sleeve to a predetermined position; the slots in said flange being so positioned that, upon rotation of said sleeve in one direction for bringing said abutment members into engagement, the slots in said flange will be in registration with the respective slots in said body.

6. In a quick change tool holder of the class described, a supporting body having a bore formed therethrough adapted for attachment for rotation with a machine with which used; an externally threaded portion on said body adjacent one end and positioned inwardly therefrom, said end having a pair of axially directed slots projecting inwardly from said end toward said threaded portion; a nut-forming sleeve threaded on said threaded portion and projecting beyond the end of said body, said sleeve having an internal groove formed adjacent its projecting end on the inner surface thereof to provide adjacent the outer end of said body a radially, inwardly projecting flange, there being formed in said flange a pair of slots adapted for registration with the slots in said body upon rotation of said sleeve to a predetermined position; an abutment member on said body; an abutment member on said sleeve adapted for engaging the abutment member on said body upon rotation of said sleeve to a predetermined position; the slots in said flange being so positioned that, upon rotation of said sleeve in one direction for bringing said abutment members into engagement, the slots in said flange will be in registration with the respective slots in said body; a tool retainer having a portion adapted for insertion into the bore of said body; a pair of diametrically outwardly projecting lugs on said tool retainer projectable through the slots formed in said flange and into registration with said groove, and adapted upon threading of said sleeve in one direction for forcing said retainer inwardly of said bore, and upon threading of said sleeve in the opposite direction for forcing said retainer out of said bore.

7. A quick change tool holder of the class described, comprising; a supporting member having a bore formed therein and provided at one end with axially directed slots extending inwardly from the end face of said end and terminating adjacent an externally threaded portion of said member; a locking ring immediately threadable onto said threaded portion in embracing relation to said face; an inwardly directed flange on the outer end of said ring having cut out portions registering with said slots upon rotation of said ring to a predetermined position and being in non-registration with said slots upon rotation out of said predetermined position, the inner face of said flange being flat; a tool retainer having a body insertable at one end into said bore; flat-faced lugs projecting outwardly from the periphery of said body and projectable through the cut out portions of said flange and into said slots, and engageable behind said flange upon rotation of said ring out of said predetermined position.

8. A quick change tool holder of the class described, comprising; a supporting member having a bore formed therein and provided at one end with axially directed slots extending inwardly from the end face of said end and terminating adjacent an externally threaded portion of said member; a locking ring immediately threadable onto said threaded portion in embracing relation to said face; an inwardly directed flange on the outer end of said ring having cut out portions registering with said slots upon rotation of said ring to a predetermined position and being in non-registration with said slots upon rotation out of said predetermined position, the inner face of said flange being flat; a tool retainer having a body insertable at one end into said bore; flat-faced lugs projecting outwardly from the periphery of said body and projectable through the cut out portions of said flange and into said slots, and engageable behind said flange upon rotation of said ring out of said predetermined position, said lugs engaging at one of their faces with the bottom of said slots and at their opposite faces with the opposed face of said flange.

References Cited in the file of this patent

UNITED STATES PATENTS

| Number | Name | Date |
|---|---|---|
| 386,262 | Pedersen | July 17, 1888 |
| 717,199 | Hollm | Dec. 30, 1902 |
| 1,041,338 | Palmgren | Oct. 5, 1912 |
| 1,075,245 | Farnum | Oct. 7, 1913 |
| 1,372,482 | Clane | Mar. 22, 1921 |
| 1,867,296 | Woodruf | July 12, 1932 |
| 2,272,185 | Chittenden | Feb. 10, 1942 |
| 2,359,594 | Turenchalk et al. | Oct. 3, 1944 |
| 2,476,874 | Johansson | July 19, 1949 |
| 2,511,416 | Rundroff | June 13, 1950 |
| 2,579,082 | Kramer | Dec. 18, 1951 |
| 2,611,621 | Patterson et al. | Sept. 23, 1952 |